Figure 1:
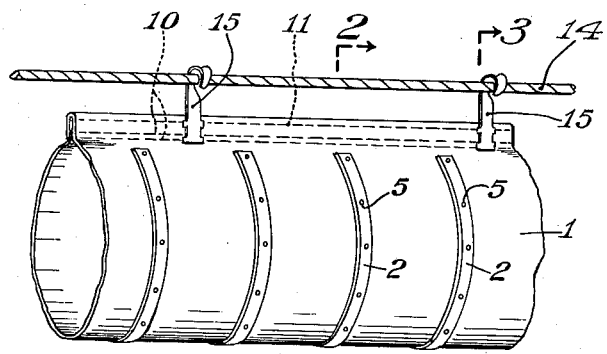

Aug. 31, 1937. W. E. BROWN 2,091,265
FLEXIBLE NONCOLLAPSIBLE TUBING
Filed Jan. 18, 1936

Wallace E. Brown, INVENTOR.

BY Walter C. Wheeler
ATTORNEY

Patented Aug. 31, 1937

2,091,265

UNITED STATES PATENT OFFICE 2,091,265

FLEXIBLE NONCOLLAPSIBLE TUBING

Wallace E. Brown, Fairfield, Conn., assignor to E. I. du Pont de Nemours & Company, Wilmington, Del., a corporation of Delaware Application January 18, 1936, Serial No. 59,659

5 Claims. (Cl. 138—54)

This invention relates to tubing or hose which may be used for the ventilation of mines and underground excavations, for transporting fluids in industrial operations and the like, and especially to a tubing or hose constructed in part of collapsible rubberized fabric and combined in such a manner as to be useful to transport air or other gases under reduced atmospheric pressures.

In ventilating mines and other underground excavations and for general ventilating purposes air has been transported both by pumping and by suction apparatus. When the air is transported at elevated pressures, as by pumping, the tubing is usually constructed of flexible collapsible material. Collapsible tubing is used because it can be easily installed, because of its low cost and because of its ease of manipulation. For use with a suction type of installation a collapsible tubing is impractical since the pressures in the tubing are lower than the surrounding atmospheric pressure. Therefore, metal or other noncollapsible tubing has been used for this purpose but the so-called solid walled or non-collapsible tubings are relatively costly, non-flexible, difficult to install and to manipulate. The installation consumes considerable time and the nonflexibility of the construction makes such tubing very poorly adaptable to turns, corners and other circumstances commonly found in mines and other underground excavations. Therefore, it is desirable to provide a flexible, relatively low cost tubing which is non-collapsible when used under suction or conditions of reduced pressure.

It is among the objects of the present invention to provide new and useful flexible tubing which is suitable for transporting air and other fluids under pressures which are less than the pressures outside of the tubing.

Another object of the invention is to provide an improved flexible, non-collapsible tubing which will be relatively economical to manufacture, use and install.

A further object is to provide a non-collapsible tubing which may be conveniently and easily assembled and manipulated where angular installations are called for and which may be quickly and easily disassembled and reassembled in difficult locations.

These objects are accomplished generally by combining tube wall material of flexible nonporous material, such as rubber coated fabric with circumferentially disposed metal bands and generally supporting the fabric so as to prevent the collapse of the tubing. One embodiment of the invention comprises pairs of internal and external metal hoops suitably fastened to each other through the body of the tubing to support the same.

Figure 2:
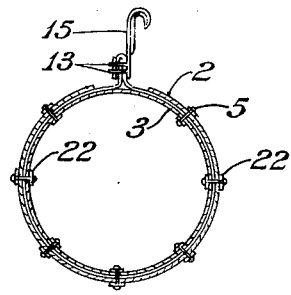
Figure 3:
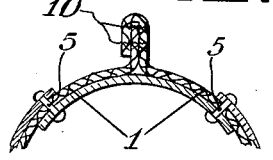
Figure 4:
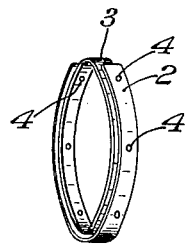
Figure 5:
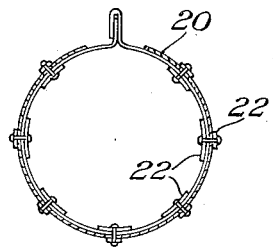
Figure 6:
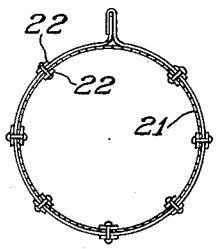
Figure 7:
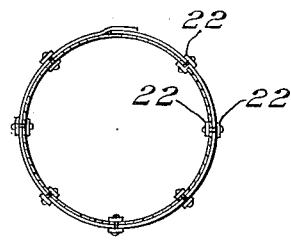

Other objects of the invention will be apparent and the invention will be more fully understood from the following description which will be made with reference to the drawing, in which, Figure 1 is a side elevational view of tubing mounted on a support in operative position, Figure 2 is a cross sectional view of the tubing taken along the line 2—2 of Figure 1, Figure 3 is an enlarged fragmentary cross sectional view of the tubing taken along the line 3—3 of Figure 1, Figure 4 is a perspective view of a pair of hoops disposed in their assembled positions, Figure 5 is a cross sectional view of a tubing assembly illustrating one modification of the invention in which the tube is supported only by an outer strap, Figure 6 is a cross sectional view of a tubing assembly illustrating another modification of the invention in which the tubing is supported by an inner ring, and Figure 7 is a cross sectional view of a tubing assembly illustrating the use of a tubular fabric.

The invention will be further illustrated by describing a specific embodiment thereof. Referring to Figure 1, the tube comprises a non-porous flexible wall material 1, such as the rubberized fabric which is described in United States Patent No. 1,432,585. On the outside are secured circular metal straps 2 which partially encircle and conform to the shape of the inner metal ring 3 and mounted concentrically therewith, as shown in Figure 4. The straps 2 and rings 3 are spaced along the tubing at suitable intervals to support the side wall 1 and prevent it from collapsing, and the rings and straps carry perforations 4 through which rivets or bolts 5 are passed to secure them in place with the side wall 1 clamped therebetween.

In forming the tube a length of fabric of suitable length for a tube section is smoothly disposed around the ring 3 and the strap 2 is riveted on the outside by means of the rivets 5 so that the edges of the fabric will project from the space between the ends of the straps. The edges of the fabric which project from between the ends of the straps 2 are brought together in a seam in any convenient manner and secured, as by stitching.

A desirable seam construction consists in bringing one edge of the tubing into an up-struck position and folding the opposite edge of the fabric thereover so as to enclose the first named edge in an inwardly facing channel. Finally the tube is closed by a double row of stitching 10 which brings the fabric snugly around the inner ring 3 and strap 2. Single stitching 11 holds the outer edge of the seam in place. This forms an upstruck rib or attachment member which serves an additional purpose of a means to stiffen the tube longitudinally. In use the hook-hangers 15 are spaced along the tube and secured to the rib 16 by means of the rivets 13. The tube is suspended on the hooks 15 from a support such as the cable 14.

The straps 2 and rings 3 may be composed desirably of metal but other materials, such as hard rubber, synthetic molded material and others which are sufficiently strong and stiff to maintain the tube in a distended position can be used.

For some purposes, it is sufficient to use either a relatively stiff strap 20 and omit the inner ring as shown in Figure 5, or to use only the inner ring 21 and omit the strap 2 as shown in Figure 6. In these modifications, the straps 20 or rings 21, as the case may be, may be secured directly to the fabric as the parts are secured together in the modification shown in Figure 1. However, it is desirable, especially when the construction shown in Figure 5 is used with suction, to use enlarged washers 22 or sections of rigid material next to the fabric to give a wider gripping area on the fabric. The washers 22 may conveniently be pieces of metal about the width of the strap 21 and bent to conform to the desired contour of the tube. Instead of forming the seam so that it will be upstruck, the edges of fabric can be overlapped as shown in Figure 7. This form of seam is especially useful where an exterior surface free from obstructions is desired.

It is evident that the invention provides tubing which is sufficiently flexible to be adjustable easily to angular installations. It is contemplated that the rings or other rigid or semi-rigid members will be sufficiently closely spaced to maintain an open tube when the pressures inside of the tube are relatively low. The rings may be bent or spring into various shapes, such as circular, elliptical etc., and they may be spaced nearer together or farther apart, as the necessity for more or less support and rigidity demands. Any means of fastening the edges of the fabric to each other so that they will be substantially without leaks may be employed, such as sewing, riveting and cementing.

As various other modifications of the invention may be made without departing from the invention, it is to be understood that no limitations are intended in the annexed claims except those which are specifically expressed or are imposed by the prior art.

I claim:

1. A tubing which comprises flexible collapsible side wall material, non-collapsible rings formed to give the tubing its cross sectional shape, said rings being spaced apart and disposed inside of the tubing, means for securing together the edges of the side wall material to provide a longitudinal rib along the tubing and a closure for the tubing, clamps on the outside to hold the side walls around the rings, said clamps having their ends spaced apart and aligned along said longitudinal rib, means to secure the clamps individually over the rings, and means on said rib to suspend the tubing.

2. A tubing which comprises flexible collapsible non-porous side wall material, non-collapsible transverse ribs spaced apart on the outside, a longitudinal rib formed by securing a portion of the side wall material together in a fold along the tube, said transverse ribs having their ends spaced apart and aligned along the longitudinal rib, clamps inside of the tubing, and means to secure the clamps and ribs together to prevent collapse of the side walls.

3. A tubing which comprises flexible collapsible non-porous side wall material, non-collapsible transverse ribs spaced apart on the inside of the tubing, a longitudinal rib formed by securing a portion of the side wall material together in a fold along the tube, means to secure the transverse ribs to the tubing, and means on the longitudinal rib to suspend the tubing.

4. A tubing which comprises a length of flexible collapsible non-porous side wall material, spaced non-collapsible supports formed to give the tubing its cross sectional contour, means for securing the side wall material to the supports to form a tubular member, and means to secure together the edges of the side wall material to provide a longitudinal closure.

5. A tubing comprising side walls of flexible, collapsible non-porous materials having longitudinally spaced non-collapsible transverse supports, said transverse supports being shaped to give the tubing its cross sectional contour, said transverse supports comprising a continuous inner member and a discontinuous outer member and said transverse supports being permanently attached to the flexible side walls.

WALLACE E. BROWN.